United States Patent
Groth et al.

(10) Patent No.: US 6,723,259 B1
(45) Date of Patent: Apr. 20, 2004

(54) ANTICOUNTERFEIT, LASER-MARKABLE LABEL PRODUCED BY DIFFRACTION GRATINGS

(75) Inventors: Detlef Groth, Halstenbeck (DE); Arne Koops, Hamburg (DE); Axel Burmeister, Buchholz (DE); Jochen Stähr, Hannover (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/496,491

(22) Filed: Feb. 2, 2000

(30) Foreign Application Priority Data

Feb. 5, 1999 (DE) .......................... 199 04 823

(51) Int. Cl.$^7$ .............................................. B29D 11/00
(52) U.S. Cl. ...................... 264/1.34; 264/1.36; 264/1.6; 264/1.7
(58) Field of Search ................... 264/1.1, 1.31, 264/1.7, 2.7, 1.6, 1.34, 1.36

(56) References Cited

U.S. PATENT DOCUMENTS

| | | | |
|---|---|---|---|
| 3,882,207 A | | 5/1975 | Hannan et al. ............... 264/1.6 |
| 4,547,141 A | * | 10/1985 | Ruschmann ................ 264/1.31 |
| 4,906,315 A | | 3/1990 | McGrew |
| 5,164,227 A | * | 11/1992 | Miekka et al. ............. 264/1.31 |
| 5,549,774 A | * | 8/1996 | Miekka et al. ............... 156/209 |
| 6,358,442 B1 | | 3/2002 | Delaney et al. ............ 264/1.31 |

* cited by examiner

*Primary Examiner*—Mathieu D. Vargot
(74) *Attorney, Agent, or Firm*—Norris, McLaughlin & Marcus, P.A.

(57) ABSTRACT

Process for producing an anticounterfeit label having a holographic image, and labels produced according to the process.

7 Claims, 2 Drawing Sheets

ANTICOUNTERFEIT, LASER-MARKABLE LABEL PRODUCED BY DIFFRACTION GRATINGS

Figure 1:
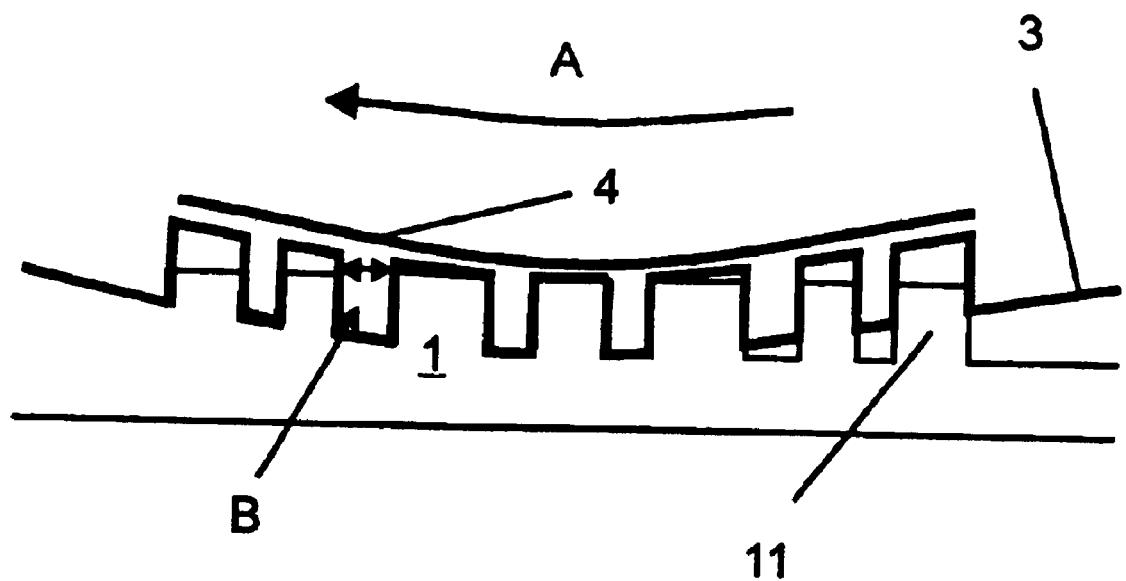

The invention relates to a process, and to its resultant products, for producing an anticounterfeit label which bears an optically active image produced by means of diffractive structures.

Since technically it is very complex to copy holograms, they are nowadays used, for example, on the widespread chipcards (ec card) and banknotes.

The known processes for producing labels with diffraction gratings and holograms are very complex and costly.

Primarily, diffractive or holographic structures are transferred by means of an embossing process (for example Holosecure with shim) or printing process (for example Holoprint) to a sheet backing, and in a subsequent step are rendered visible by the application of a metallic film.

One way of transferring the holographic metallic film to the backing material (for example concert tickets, banknotes) is by means of a hot embossing process. A disadvantage of these labels is that they possess a high level of susceptibility to mechanical and environmental effects. Under conditions of normal use, they may lose their optical properties, and so it cannot be ascertained whether the loss is an indication of counterfeiting or of copious usage.

For this reason, labels with a protective laminate are used in order to counter these disadvantages.

Hologram sheets of this kind have the following structure:

Backing sheet made, for example, of polyethylene terephthalate (PET) with a thickness of preferably 12 $\mu$m, to which a structured coating film is applied Metal film of from 1 to 10 nm (for example, vapour-coated aluminium)

Adhesive layer with a preferred thickness of between 10 and 25 $\mu$m.

This multilayer structure fulfils its purpose, since the resulting product is mechanically more resistant. Nevertheless, this structure has a tendency for the individual layers to separate—that is, a tendency towards delamination—and so, as a result of the destruction brought about through usage, the identification of authenticity is no longer possible. All of these methods are applied to the surface and therefore can be used only in an extremely limited manner if at all for the known laser labels which are used, for example, for identification plates, since then the extremely resistant surface of high optical quality is altered and impaired. Furthermore, the application of an additional layer as described above prevents markability and cutability by means of a NdYAG laser.

The object of the invention is to provide a process for producing a sheet having a hologram without the known disadvantages of the prior art.

Accordingly, the invention provides a process for producing a sheet, in which first of all a support foil is embossed by means of an embossing tool, the embossing tool having holographic structures, and then a sheet is produced on the embossed support foil so that the structure is transferred to the sheet and results in at least one hologram.

Therefore, the side of the embossing tool facing the material to be embossed is shaped so as to give a structure which comprises a diffraction grating or a holographic image.

Since this hologram is produced in the sheet itself, there is no harmful multilayer structure and the diffraction grating produced in this way possesses the same resistance and laserability as the sheet itself.

In one advantageous embodiment the support foil consists of a permanently embossed thermoset or thermoplastic material, in particular polyester or polyamide. The support foil preferably has a thickness of from 12 to 500 $\mu$m, in particular 50 $\mu$m.

The support foil can be provided with a very wide variety of motifs, examples being company logos or advertising. The embossing of the support foil produces a negative impression on the visible surface of the sheet of the invention. The embossing of the support foil can be carried out, for example, in varying thickness and/or depth using a metal embossing die. The depth of embossing is dependent on the embossing pressure set, which acts on the magnetic cylinder used in the embossing process, and counterpressure cylinder.

In a further advantageous embodiment, the sheet is extruded, coated or cast onto the support foil.

The sheet preferably consists of a coating film, which in particular is subsequently subjected to electron beam curing.

Four types of coating material can be used in principle for the object of the invention, provided that their stability is sufficient: for example, acid-curing alkyd-melamine resins, addition-crosslinking polyurethanes, free-radically curing styrene coating materials, and the like. Particularly advantageous, however, are radiation-curing coating materials, since they cure very rapidly without laborious evaporation of solvents or the action of heat. Such coating materials have been described, for example, by A. Vrancken (Farbe und Lack 83, 3 (1977) 171).

Furthermore, the coating film preferably has a thickness of from 0.5 to 30 $\mu$m, in particular from 5 to 15 $\mu$m.

The coating film employed with preference is applied to the embossed support foil and is cured under effectively oxygen-free conditions by the action of an electron beam of high energy (from 150 to 500 kV).

Furthermore, the coating film is preferably multilayer, and the layers consist of cured, i.e. crosslinked coating material: in particular, they comprise an upper coating film which is from 1 to 20 $\mu$m thick, is applied without solvent and is cured by means of electron beams, and a lower coating film which is from 20 to 500 $\mu$m thick, is applied without solvent and is cured by means of electron beams.

In a further advantageous embodiment, an additional adhesive layer of from 5 to 70 $\mu$m, in particular from 10 to 30 $\mu$m, in thickness is arranged on the sheet and, if required, a release paper is arranged on this adhesive layer. The third layer, comprising a pressure-sensitive adhesive, hot-melt adhesive or reactive adhesive or the like, is provided for bonding to a substrate.

Finally, the concept of the invention embraces a sheet obtainable by a process as described above.

The sheet produced in accordance with the process of the invention features a large number of advantages such as were not foreseeable for the person skilled in the art. On the basis of the holograms, the sheet is rapidly identifiable, the holograms being visible optically but virtually intangible. Therefore, essentially no haptic impression is produced. Using the sheet, the presentation of holograms even on a black substrate is possible for the first time.

The invention will be elucidated below with reference to two working examples, without being restricted thereto.

Figure 2:
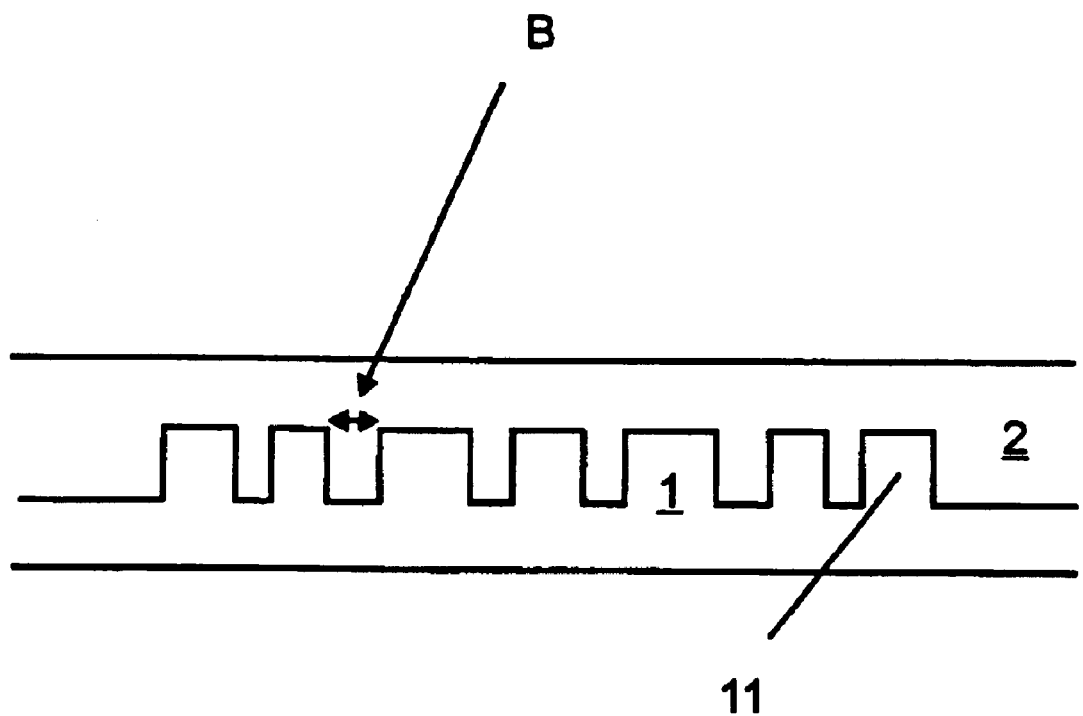

FIG. 1 shows the embossing of the support foil and
FIG. 2 shows the structure of the sheet of the invention.

According to FIG. 2, the desired holograms are first of all embossed on a support foil 1 and comprise, for example, the company logo of the manufacturer of the sheet of the invention. This is done using a roller 4 on which a metal embossing die 3 is fastened. The embossing die 3 has appropriate diffraction gratings.

The support foil 1 is guided along under the roller 4, which rotates in the direction of the arrow and is pressed onto the support foil 1 at a pressure of 500 to 2000 psi. The support foil 1 carries the individual embossing lines 11, whose largest spacing A always has a width of less than 20 µm.

FIG. 2 shows how a coating film 2 has been cast and distributed on the previously embossed support foil 1. In the coating film 2, this produces embossed patterns whose width B is substantially identical to the distance A.

Following the removal of the sheet from the support film 1, it is possible to identify holograms, which in this case leave no haptic impression, on the sheet obtained from the process of the invention.

EXAMPLE 1

A commercial polyurethane acrylate made from long-chain polyesterdiol, aliphatic diisocyanate and terminal acrylic groups (molecular weight approximately 1500, functionality 2) is mixed with 20% hexanediol bisacrylate. This gives a liquid with a high viscosity of about 10 Pa*s. This liquid is used to prepare:

- a black paste A by grinding with 12% of carbon black FCF (average particle diameter 23 µm) on a triple-roll mill, and
- a white paste B by grinding 45% of an Al and Si stabilized rutile pigment ($TiO_2$ content 90%, density 3.9 $g/cm^3$).

Paste A is coated in a thickness of 10 µm onto a 50 µm thick, biaxially oriented and embossed polyester sheet and cured under inert gas by means of an electron beam 350 keV with a dose of 80 kGy.

Atop this there is applied a white paste B with a thickness of 50 µm, and curing is again carried out under inert gas with the electron beam, with a dose of 3 Mrad.

This product is coated with a pressure-sensitive adhesive in accordance with DE-OS 15 69 898, so that after drying the film has a thickness of 20 µm. The pressure-sensitive adhesive is lined with commercial release paper.

Subsequently, the polyester sheet is removed so that the embossed and otherwise mirror-smooth black surface of the product appears.

This surface is capable of rapid marking with a bar code, for example, using a controllable outlet laser. The contrast is so high that the code can be read without error using an evaluation device from a distance of 1 m.

Heating of the material at 200° C. for 1 hour results in shrinkage of less than 1% in the lengthwise and transverse directions. Immersion in water and/or weathering in a Weatherometer for 500 h results in no adverse effects.

What is claimed is:

1. Process for producing a sheet bearing a hologram, consisting essentially of the steps of, in order:

embossing a support foil on one side by means of an embossing tool having holographic structures, providing a sheet comprising at least first and second layers on one side of the embossed support foil, each of said first and second layers being provided by a method selected from the group consisting of extruding, coating or casting said first and second layers, so that corresponding holographic structures are imparted to at least said first layer of the sheet by the support foil, wherein the first and second layers include a crosslinked material and wherein the first layer is a first color and the second layer is a second color, the first color being different from the second color, subjecting each of said first and second layers to electron beam curing, optionally, providing on the sheet one or more adhesive layers, said one or more adhesive layers optionally having a release paper arranged thereon, and removing the support foil, whereby at least one hologram based on said corresponding holographic structure is produced on the sheet.

2. Process according to claim 1, wherein the support foil is a permanently embossed thermoset or thermoplastic material.

3. Process according to claim 1, wherein the support foil is a polyester or polyamide.

4. Process according to claim 1, wherein the sheet has a thickness of from 0.5 to 30 µm.

5. Process according to claim 1, wherein an additional adhesive layer of from 5 to 70 µm in thickness is arranged on the sheet and, optionally, a release paper is arranged on said adhesive layer.

6. Process according to claim 1, wherein the removal of the support foil is the final processing step, whereby a final product is thereby produced.

7. Process according to claim 1, wherein the second layer of the sheet is provided only after the first layer of the sheet is subjected to curing.

* * * * *